United States Patent
Suzuki

(10) Patent No.: US 10,051,141 B2
(45) Date of Patent: Aug. 14, 2018

(54) INFORMATION PROCESSING APPARATUS AND INFORMATION PROCESSING METHOD

(71) Applicant: Masahiro Suzuki, Tokyo (JP)

(72) Inventor: Masahiro Suzuki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/485,538

(22) Filed: Apr. 12, 2017

(65) Prior Publication Data

US 2017/0318174 A1 Nov. 2, 2017

(30) Foreign Application Priority Data

Apr. 27, 2016 (JP) .................... 2016-088688

(51) Int. Cl.
G06F 3/12 (2006.01)
H04N 1/00 (2006.01)
H04N 1/04 (2006.01)
H04N 1/21 (2006.01)

(52) U.S. Cl.
CPC ..... *H04N 1/00822* (2013.01); *H04N 1/00925* (2013.01); *H04N 1/0464* (2013.01); *H04N 1/2158* (2013.01); *H04N 2201/0081* (2013.01)

(58) Field of Classification Search
CPC .............................................. H04N 1/00822
See application file for complete search history.

(56) References Cited

U.S. PATENT DOCUMENTS

| 7,831,657 B2 | 11/2010 | Sugishita et al. |
| 7,940,407 B2 | 5/2011 | Suzuki et al. |
| 8,902,474 B2 * | 12/2014 | Ashida ............... H04N 1/40068 358/447 |
| 2006/0212629 A1 | 9/2006 | Suzuki et al. |
| 2007/0076244 A1 | 4/2007 | Suzuki et al. |
| 2008/0231912 A1 | 9/2008 | Murakata |
| 2011/0016474 A1 | 1/2011 | Sugishita et al. |
| 2015/0032885 A1 | 1/2015 | Suzuki |
| 2016/0274820 A1 | 9/2016 | Suzuki |
| 2016/0295567 A1 * | 10/2016 | Nogawa ............... H04W 8/005 |

FOREIGN PATENT DOCUMENTS

| JP | H11-177770 | 7/1999 |
| JP | 4860518 | 1/2012 |

* cited by examiner

*Primary Examiner* — King Poon
*Assistant Examiner* — Michael Burleson
(74) *Attorney, Agent, or Firm* — IPUSA, PLLC

(57) ABSTRACT

An information processing apparatus includes a mode setting unit in which a value indicating whether a scanning device is for simplex scanning or duplex scanning is set up, an interface unit that controls whether to enable signal exchange with an external memory based on the value set up in the mode setting unit, and a transfer unit that retrieves image data from the external memory and transfers the image data to an image processing unit. When the value in the mode setting unit indicates that the scanning device is for duplex scanning, the interface unit enables signal exchange with the external memory, and the transfer unit transfers the image data retrieved from the external memory to the image processing unit. When the value in the mode setting unit indicates that the scanning device is for simplex scanning, the interface unit prohibits signal exchange with the external memory.

15 Claims, 8 Drawing Sheets

INFORMATION PROCESSING APPARATUS AND INFORMATION PROCESSING METHOD

CROSS-REFERENCE TO RELATED APPLICATIONS

The present application claims priority under 35 U.S.C. § 119 to Japanese Patent Application No. 2016-088688 filed on Apr. 27, 2016, the entire contents of which are incorporated herein by reference.

BACKGROUND OF THE INVENTION

1. Field of the Invention

The present invention relates to an information processing apparatus and an information processing method.

2. Description of the Related Art

Simplex image scanning apparatuses for scanning a document one side at a time and duplex image scanning apparatuses for scanning both sides of a document are known.

Some duplex image scanning apparatuses are provided with two image processing units that perform image processing on front side image data and back side image data, for example. Also, some duplex image scanning apparatuses include a memory for storing back side image data for each page and are configured to retrieve the back side image data from the memory after performing image processing on front side image data and perform image processing on the back side image data. The duplex image scanning apparatuses with such a configuration may only require one image processing unit.

In recent years, from the viewpoint of cost, duplex image scanning apparatuses with the latter configuration are becoming predominant. On the other hand, a simplex image scanning apparatus only requires an image processing unit that performs image processing with respect to each image data input, and does not require a memory for storing image data for each page.

The image processing units and the memory described above are typically implemented in an image scanning apparatus as components of an ASIC (Application Specific Integrated Circuit). Whether a memory is required or the number of image processing units required may vary depending on whether the image scanning apparatus is for duplex scanning or simplex scanning, for example. Thus, both ASICs for duplex scanning and ASICs for simplex scanning are being manufactured and developed. However, due to cost issues, for example, an ASIC with high versatility that can be used for both duplex scanning and simplex scanning is desired.

SUMMARY OF THE INVENTION

According to one embodiment of the present invention, an information processing apparatus is provided that includes a mode setting unit in which a value indicating whether a scanning device is for simplex scanning or duplex scanning is set up, an interface unit configured to control whether to enable signal exchange with an external memory based on the value set up in the mode setting unit, and a transfer unit configured to retrieve image data from the external memory and transfer the image data to an image processing unit based on the value set up in the mode setting unit. When the value set up in the mode setting unit indicates that the scanning device is for duplex scanning, the interface unit enables signal exchange with the external memory, and the transfer unit transfers the image data retrieved from the external memory to the image processing unit. When the value set up in the mode setting unit indicates that the scanning device is for simplex scanning, the interface unit prohibits signal exchange with the external memory.

DESCRIPTION OF THE EMBODIMENTS

In the following, embodiments of the present invention are described with reference to the accompanying drawings.

First Embodiment

Figure 1:
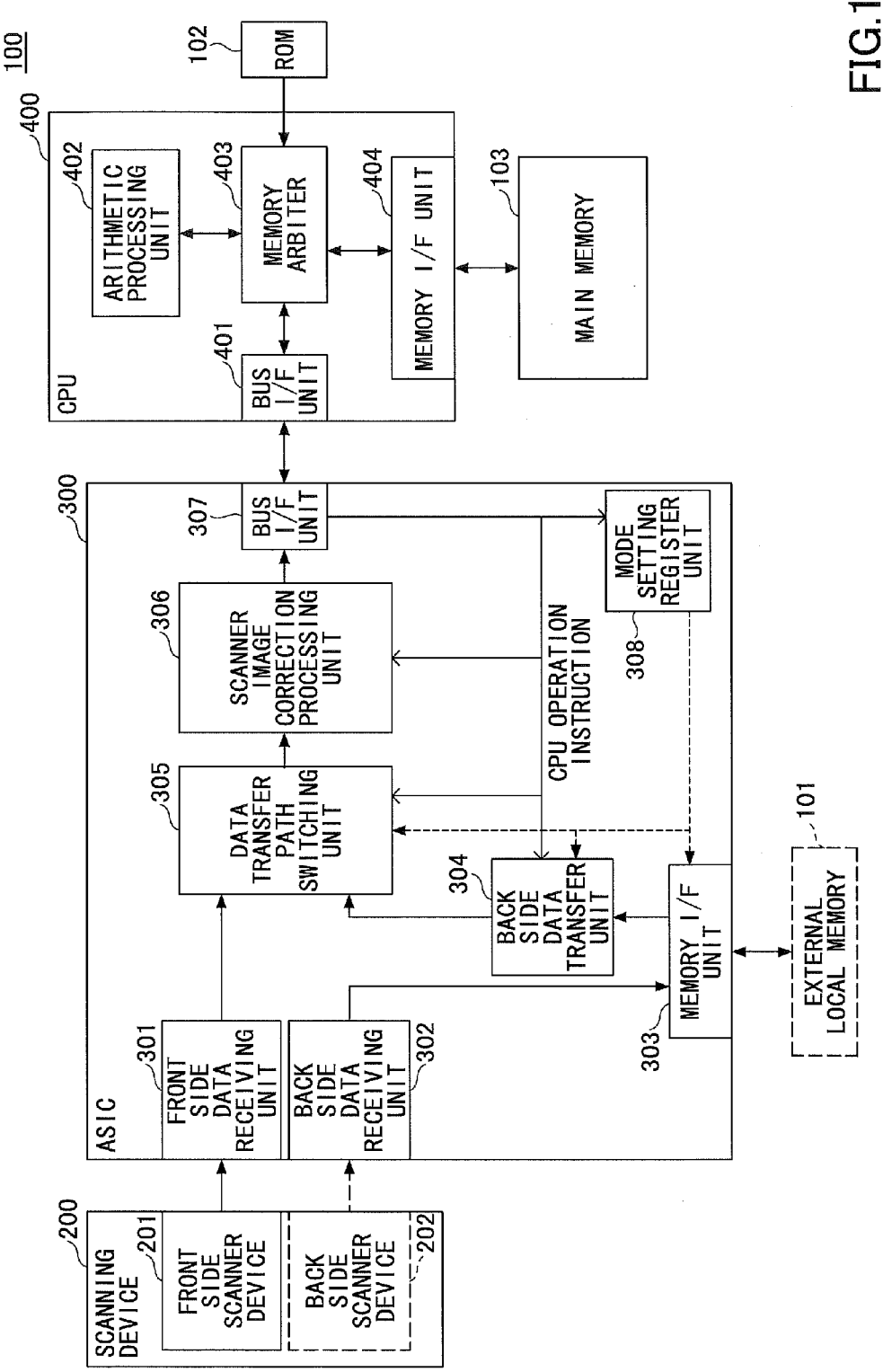
FIG. 1 is a diagram illustrating an image scanning apparatus according to a first embodiment of the present invention.

FIG. 1 is a diagram illustrating an image scanning apparatus 100 according to a first embodiment of the present invention.

The image scanning apparatus 100 according to the present embodiment includes an external local memory 101, a ROM (Read Only Memory) 102, a main memory 103, a scanning device 200, an ASIC (Application Specific Integrated Circuit) 300, and a CPU (Central Processing Unit) 400.

In the image scanning apparatus 100 according to the present embodiment, exchange of image data (signal exchange) between the ASIC 300 and the external local memory 101 is controlled based on whether the scanning device 200 is for simplex scanning or duplex scanning.

More specifically, when the scanning device 200 is for duplex scanning, the image scanning apparatus 100 according to the present embodiment enables exchange of image data between the ASIC 300 and the external local memory 101. The image scanning apparatus 100 stores back side image data in the external local memory 101, retrieves the back side image data stored in the external local memory 101 after image processing on front side image data is completed, and performs image processing on the back side image data retrieved from the external local memory 101.

When the scanning device 200 is for simplex scanning, the image scanning apparatus 100 according to the present embodiment prohibits exchange of image data (signal exchange) between the ASIC 300 and the external local memory 101, and performs image processing on input image data.

As described above, in the present embodiment, the ASIC 300 can be applied to both duplex scanning and simplex scanning by controlling whether to enable exchange of image data (signal exchange) between the ASIC 300 and the external local memory 101. In this way, versatility of the ASIC 300 can be improved.

Note that in the present embodiment, a state in which the ASIC 300 and the external local memory 101 are not connected may be referred to as the ASIC 300 and the external local memory 101 being disconnected.

The ASIC 300 and the external local memory 101 being disconnected refers to a state in which output from an input/output terminal of the ASIC 300 and input to the input/output terminal of the ASIC 300 are cut off (i.e., input/output operations of the input/output terminal are disabled). More specifically, the potential of the input/output terminal of the ASIC 300 is fixed.

Also, in the present embodiment, a state in which signal exchange between the ASIC 300 and the external local memory 101 is enabled refers to a state in which the ASIC 300 and the external local memory 101 are connected.

The ASIC 300 and the external local memory 101 being connected refers to a state in which the input/output terminal of the ASIC 300 enables output from the ASIC 300 to the external local memory 101 and input from the external local memory 101 to the ASIC 300.

The scanning device 200 according to the present embodiment may be a scanner, for example. The scanning device 200 scans an image, converts the scanned image into electronic data, and transfers the electronic data to the ASIC 300. In FIG. 1, the scanning device 200 is a duplex scanning device including a front side scanner device 201 and a back side scanner device 202.

The front side scanner device 201 scans an image of the front side of a document and transfers the front side image data to the ASIC 300. The back side scanner device 202 scans an image of the back side of the document and transfers the back side image data to the ASIC 300. The front side scanner device 201 and the back side scanner device 202 respectively transfer front side image data and back side image data to the ASIC 300 in parallel.

Note that when the scanning device 200 is used for simplex scanning, the scanning device 200 only includes the front side scanner device 201.

The ASIC 300 according to the present embodiment performs image processing on image data received from the scanning device 200 and outputs the processed image data to the CPU 400. That is, the ASIC 300 according to the present embodiment may be regarded as an image processing apparatus that performs image processing on image data. Further, the ASIC 300 according to the present embodiment may be regarded as an information processing apparatus that performs predetermined processing on information such as image data.

The CPU 400 stores image data input thereto in the main memory 103. Note that the ASIC 300 and the CPU 400 are described in detail below.

The external local memory 101 according to the present embodiment temporarily stores back side image data scanned by the back side scanner device 202. The external local memory 101 according to the present embodiment is an external memory provided outside the ASIC 300 and may be implemented by a DDR SDRAM (Double Data Rate Synchronous Dynamic Random Access Memory) or a DRAM (Dynamic Random Access Memory), for example.

The ROM 102 according to the present embodiment stores a program to be executed by the CPU 400 and various setting values, for example. Specifically, for example, the ROM 102 according to the present embodiment may store a value indicating whether the scanning device 200 is for duplex scanning or simplex scanning.

The main memory 103 is used for executing programs stored in the ROM 102 and storing image data that has been subjected to image processing, for example.

In the image scanning apparatus 100 according to the present embodiment, the external local memory 101, the ROM 102, the main memory 103, and the ASIC 300 may be mounted on the same substrate, for example.

In the following, the ASIC 300 according to the present embodiment will be described. The ASIC 300 according to the present embodiment includes a front side data receiving unit 301, a back side data receiving unit 302, a memory I/F (interface) unit 303, a back side data transfer unit 304, a data transfer path switching unit 305, a scanner image correction processing unit 306, a bus I/F unit 307, and a mode setting register unit 308.

The above-described units of the ASIC 300 according to the present embodiment may be implemented by hardware such as an electronic circuit and/or an electronic component, for example.

The ASIC 300 according to the present embodiment uses the scanner image correction processing unit 306 to perform image processing including a correction process on image data and transfers the resulting processed image data to the main memory 103.

Also, the ASIC 300 according to the present embodiment determines whether the scanning device 200 is for duplex scanning or simplex scanning. When the scanning device 200 is for duplex scanning, the ASIC 300 operates the front side data receiving unit 301 and the back side data receiving unit 302 in parallel, and temporarily stores the back side image data in the external local memory 101. After completing image processing on the front side image data, the ASIC 300 retrieves the back side image data from the external local memory 101, performs image processing on the back side image data using the scanner image correction processing unit 306, and transfers the resulting processed image data to the main memory 103.

When the scanning device 200 is for simplex scanning, the ASIC 300 disconnects from the external local memory 101, uses the scanner image correction processing unit 306 to perform image processing on image data received by the front side data receiving unit 301, and transfers the resulting processed image data to the main memory 103.

The front side data receiving unit 301 receives front side image data from the front side scanner device 201 included in the scanning device 200 and outputs the received front side image data to the data transfer path switching unit 305.

The back side data receiving unit 302 is operated only when duplex scanning is performed in the image scanning apparatus 100. The back side data receiving unit 302 receives back side image data from the back side scanner device 202 and outputs the received back side image data to the memory I/F unit 303.

The memory I/F unit 303 is operated only when duplex scanning is performed and is configured to connect the ASIC 300 to the external local memory 101. In other words, the memory I/F unit 303 functions as an interface for enabling back side image data output from the back side data receiving unit 302 to be stored in the external local memory 101.

Also, the memory I/F unit 303 acts as an access interface for enabling the back side data transfer unit 304 to retrieve back side image data from the external local memory 101 after the scanner image correction processing unit 306 completes image processing on front side image data.

Also, when the scanning device 200 is for simplex scanning, the memory I/F unit 303 performs terminal processing for disconnecting the external local memory 101 from the ASIC 300. Note that the memory I/F unit 303 is described in detail below.

The back side data transfer unit 304 is controlled by the CPU 400. After the scanner image correction processing unit 306 completes image processing on front side image data, the back side data transfer unit 304 retrieves back side image data from the external local memory 101 and outputs the retrieved back side image data to the data transfer path switching unit 305. Note that the back side data transfer unit 304 is operated only when duplex scanning is performed.

The data transfer path switching unit 305 is controlled by the CPU 400. The data transfer path switching unit 305 selects either front side image data or back side image data and outputs the selected image data to the scanner image correction processing unit 306.

That is, the back side data transfer unit 304 and the data transfer path switching unit 305 according to the present embodiment implement a transfer unit that transfers image data retrieved from the external local memory 101 to the scanner image correction processing unit 306.

The scanner image correction processing unit 306 is an image processing unit that performs a correction process, such as shading correction, for correcting scanner specific features in image data acquired by the scanning device 200.

The bus I/F unit 307 controls an interface protocol with the CPU 400 to transfer processed image data obtained by image correction processing to the main memory 103.

The mode setting register unit 308 is an example of a mode setting unit in which a value indicating whether the scanning device 200 is for duplex scanning or simplex scanning is set up based on a determination made by the CPU 400 upon starting the image scanning apparatus 100, for example. Specifically, a value indicating whether to establish connection with the external local memory 101 is set up in the mode setting register unit 308.

The value set up in the mode setting register unit 308 is communicated to the memory I/F unit 303 and the data transfer path switching unit 305. Whether the memory I/F unit 303 and the data transfer path switching unit 305 are to be operated is controlled by the value set up in the mode setting register unit 308.

In the following, the CPU 400 according to the present embodiment will be described. The CPU 400 according to the present embodiment includes a bus I/F unit 401, an arithmetic processing unit 402, a memory arbiter 403, and a memory I/F unit 404. The above units of the CPU 400 may be implemented by hardware such as an electronic circuit and/or an electronic component, for example.

The bus I/F unit 401 functions as an interface for storing image data in the main memory 103 and outputting image data from the main memory 103.

The arithmetic processing unit 402 controls the image scanning apparatus 100 based on a program stored in the ROM 102, for example.

The memory arbiter 403 and the memory I/F unit 404 perform various controls, such as path selection and control of access priority to the ROM 102 and the main memory 103, for example.

Figure 2:
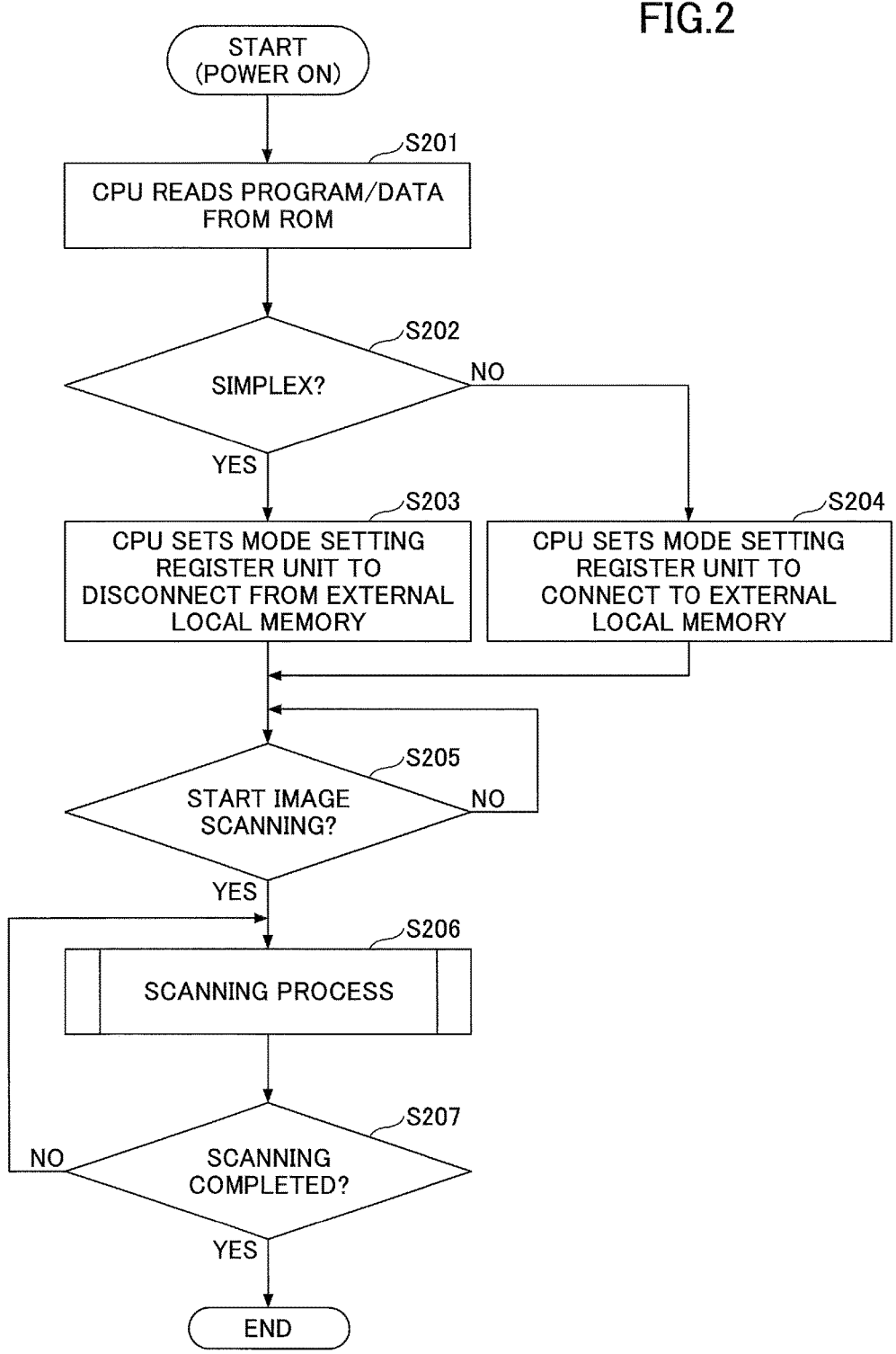
FIG. 2 is a flowchart illustrating operations of the image scanning apparatus according to the first embodiment.

In the following, operations of the image scanning apparatus 100 according to the present embodiment will be described: FIG. 2 is a flowchart illustrating example operations of the image scanning apparatus 100 according to the first embodiment. The process operations illustrated in FIG. 2 may be implemented by the arithmetic processing unit 402 of the CPU 400 executing one or more programs stored in the ROM 102, for example.

In the image scanning apparatus 100 according to the present embodiment, the CPU 400 reads a program stored in the ROM 102 and starts operations based on the program stored in the ROM 102 (step S201). Then, based on information stored in the ROM 102, the CPU 400 determines whether the scanning device 200 is for duplex scanning (duplex scanning device) or simplex scanning (simplex scanning device) (step S202).

If it is determined in step S202 that the scanning device 200 is for simplex scanning, the CPU 400 sets a corresponding value in the mode setting register unit 308 to disconnect the external local memory 101 (step S203) and proceeds to step S205, which is described below. At this time, the mode setting register unit 308 causes the memory I/F unit 303 to perform terminal processing for disconnecting the external local memory 101. Note that the terminal processing is described in detail below.

If it is determined in step S202 that the scanning device 200 is for duplex scanning, the CPU 400 sets a corresponding value in the mode setting register unit 308 to establish connection with the external local memory 101 (step S204).

Then, the CPU 400 determines whether an instruction to start image scanning (scanning start instruction) has been issued by the scanning device 200 (step S205). Note that the scanning start instruction may be input by the user operating an operation member of the image scanning apparatus 100, for example.

If it is determined in step S205 that no scanning start instruction has been issued, the CPU 400 waits until a scanning start instruction is issued.

If it is determined in step S205 that a scanning start instruction has been issued, the image scanning apparatus 100 performs an image scanning process using the scanning apparatus 200, the ASIC 300, and the CPU 400 (step S206). The ASIC 300 according to the present embodiment performs relevant operations based on the determination result of step S202. Note that the operations of the ASIC 300 are described in detail below.

Then, the image scanning apparatus 100 determines whether the image scanning process has been completed (step S207). For example, the image scanning apparatus 100 may determine that the image scanning process has been completed when the scanning device 200 does not detect a document for at least a predetermined time period and transmit a scanning completion notification to the CPU 400.

If it is determined in step S207 that the image scanning process has not been completed, the image scanning apparatus 100 returns to step S206. If it is determined that the image scanning process has been completed, the image scanning apparatus 100 ends the process of FIG. 2.

In the following, operations of the ASIC 300 implemented during the image scanning process will be described with reference to FIGS. 3 and 4.

Figure 3:
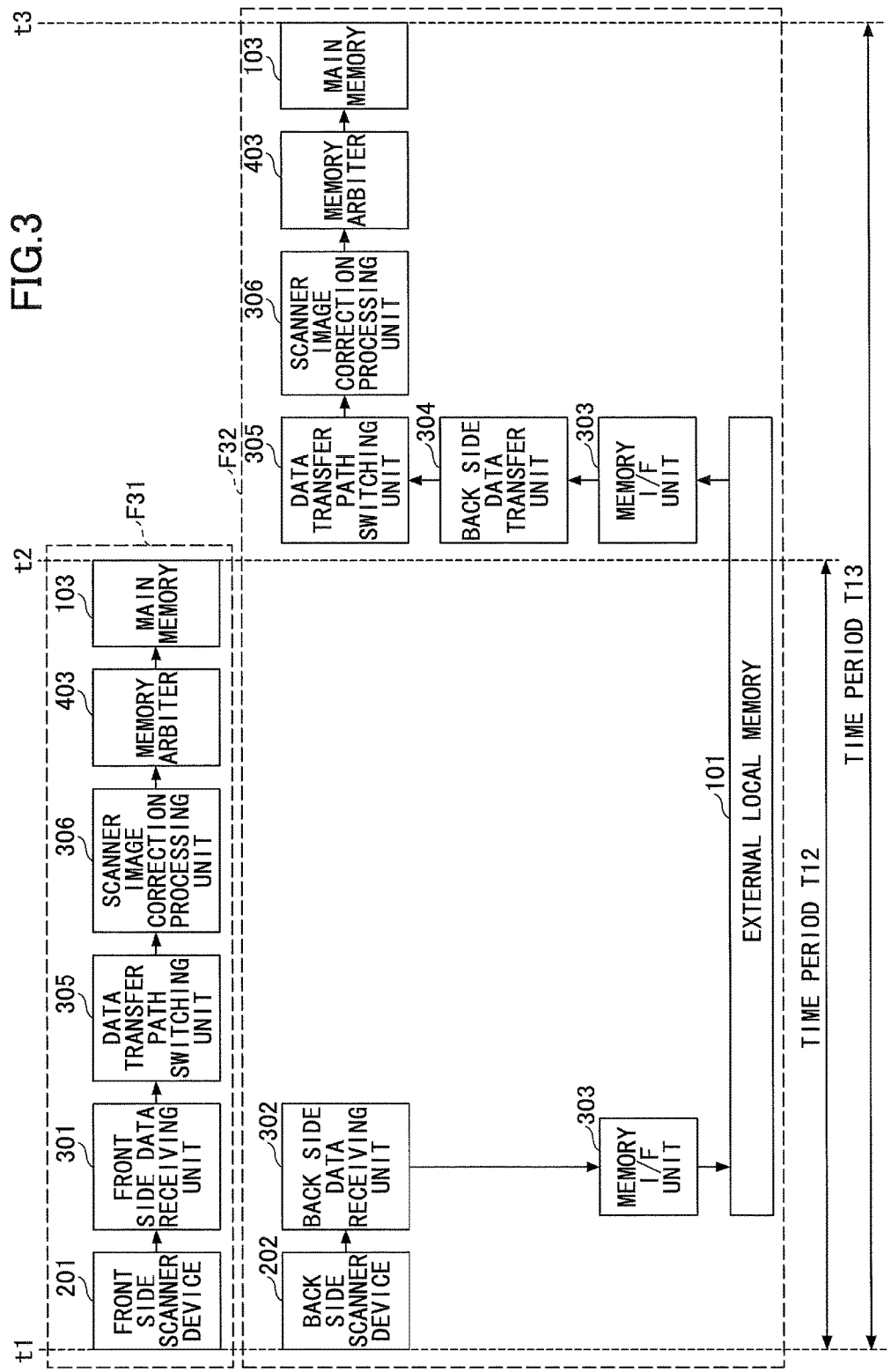
FIG. 3 is a diagram illustrating operations of an ASIC according to the first embodiment.

FIG. 3 is a diagram illustrating operations of the ASIC 300 according to the first embodiment. FIG. 3 illustrates example operations of the ASIC 300 to be implemented in a case where the scanning device 200 is determined to be a duplex scanning device in step S202 of FIG. 2 and a value set up in the mode setting register unit 308 indicates that connection is to be established with the external local memory 101. In other words, FIG. 3 illustrates operations of the ASIC 300 when the external local memory 101 is connected to the ASIC 300 and image scanning is performed on both sides of a document.

Also, in FIG. 3, operations F31 represent operations on front side image data, and operations F32 represent operations on back side image data.

When an image scanning process is started at time t1, the front side scanner device 201 and the back side scanner device 202 start scanning images in parallel.

In the ASIC 300, front side image data of the image scanned by the front side scanner device 201 is received by the front side data receiving unit 301. Also, back side image data of the image scanned by the back side scanner device 202 is received by the back side data receiving unit 302.

The back side image data received by the back side data receiving unit 302 is stored in the external local memory 101 via the memory I/F unit 303.

Meanwhile, the ASIC 300 performs image processing on the front side image data received by the front side data receiving unit 301. The front side image data received by the front side data receiving unit 301 is output to the data transfer path switching unit 305.

Note that the data transfer path switching unit 305 receives a notification indicating the value set up in the mode setting register unit 308 and selects a path for transferring the front side image data output by the front side data receiving unit 301 to the scanner image correction processing unit 306.

Thus, the front side image data is output to the scanner image correction processing unit 306. The scanner image correction processing unit 306 performs image processing such as a correction process on the front side image data and outputs the processed front side image data. The processed front side image data is transferred to the memory arbiter 403 via the bus I/F units 307 and 401, and is stored in the main memory 103 via the memory arbiter 403. In the example of FIG. 3, it is assumed that storage of the front side image data in the main memory 103 is completed at time t2. That is, in the example of FIG. 3, the correction process on the front side image data and storage of the back side image data are completed within time period T12 from time t1 to time t2.

When the correction process on the front side image data is completed at time t2, the CPU 400 instructs the ASIC 300 to retrieve the back side image data from the external local memory 101 via the bus I/F units 401 and 307.

Specifically, the CPU 400 instructs the back side data transfer unit 304 to retrieve the back side image data stored in the external local memory 101. Further, the CPU 400 instructs the data transfer path switching unit 305 to switch the path to be used for transferring image data.

The back side data transfer unit 304 receives the instruction from the CPU 400, retrieves the back side image data from the external local memory 101, and transfers the retrieved back side image data to the data transfer path switching unit 305.

The data transfer path switching unit 305 receives the instruction from the CPU 400, and selects a path for transferring the back side image data output by the back side data transfer unit 304 to the scanner image correction processing unit 306.

Thus, the back side image data is output to the scanner image correction processing unit 306. The scanner image correction processing unit 306 performs image processing such as a correction process on the back side image data and outputs the processed back side image data. The output back side image data is transferred to the memory arbiter 403 via the bus I/F units 307 and 401, and is stored in the main memory 103 via the memory arbiter 403. In the example of FIG. 3, it is assumed that storage of the back side image data in the main memory 103 is completed at time t3. That is, in the example of FIG. 3, within a time period T13 from time t1 to time t3, image processing on the front side image data and the back side image data is completed, storage of the front side image data and the back side image data in the main memory 103 is completed, and input of the front side image data and the back side image to the image scanning apparatus 100 is completed.

Note that FIG. 3 illustrates example operations in the case where the image scanning apparatus 100 is a duplex scanning apparatus. On the other hand, in the case where the image scanning apparatus 100 is a simplex scanning apparatus, only the operations F31 of FIG. 3 are performed. That is, the external local memory 101 is not connected to the ASIC 300 in this case. Also, note that the case where the image scanning apparatus 100 is a duplex scanning apparatus corresponds to the case where the scanning device 200 is a duplex scanning device, and the case where the image scanning apparatus 100 is a simplex scanning apparatus corresponds to the case where the scanning device 200 is a simplex scanning device.

As described above, in the present embodiment, when the image scanning apparatus 100 is a duplex scanning apparatus, the back side image data is stored in the external local memory 101 while the scanner image correction processing unit 306 performs image processing such as a correction process on the front side image data. In the present embodiment, when the correction process on the front side image data performed by the scanner image correction processing unit 306 is completed, the back side image data is retrieved from the external local memory 101 so that a correction process may be performed on the back side image data.

Thus, according to an aspect of the present embodiment, there is no need to provide a memory for storing image data in the ASIC 300. Further, the ASIC 300 according to the present embodiment can be used in both a case where the image scanning apparatus 100 is a duplex scanning apparatus and a case where the image scanning apparatus 100 is a simplex scanning apparatus. That is, the same ASIC 300 can be used regardless of the configuration of the image scanning apparatus 100.

In this way, costs for developing the ASIC 300 can be reduced. Further, versatility of the ASIC 300 can be improved, for example.

Note that in the example of FIG. 3, retrieval of the back side image data is started after storage of the processed front side image data in the main memory 103 is completed. However, the present invention is not limited thereto, and retrieval of the back side image data may be started before storage of the processed front side image data in the main memory 103 is completed. That is, in the present embodiment, retrieval of the back side image data may be started at any time after image processing on the front side image data by the scanner image correction processing unit 306 is completed.

In the following, referring to FIG. 4, the timing of starting retrieval of the back side image data will be described. FIG. 4 is another diagram illustrating operations of the ASIC 300 according to the first embodiment.

Figure 4:
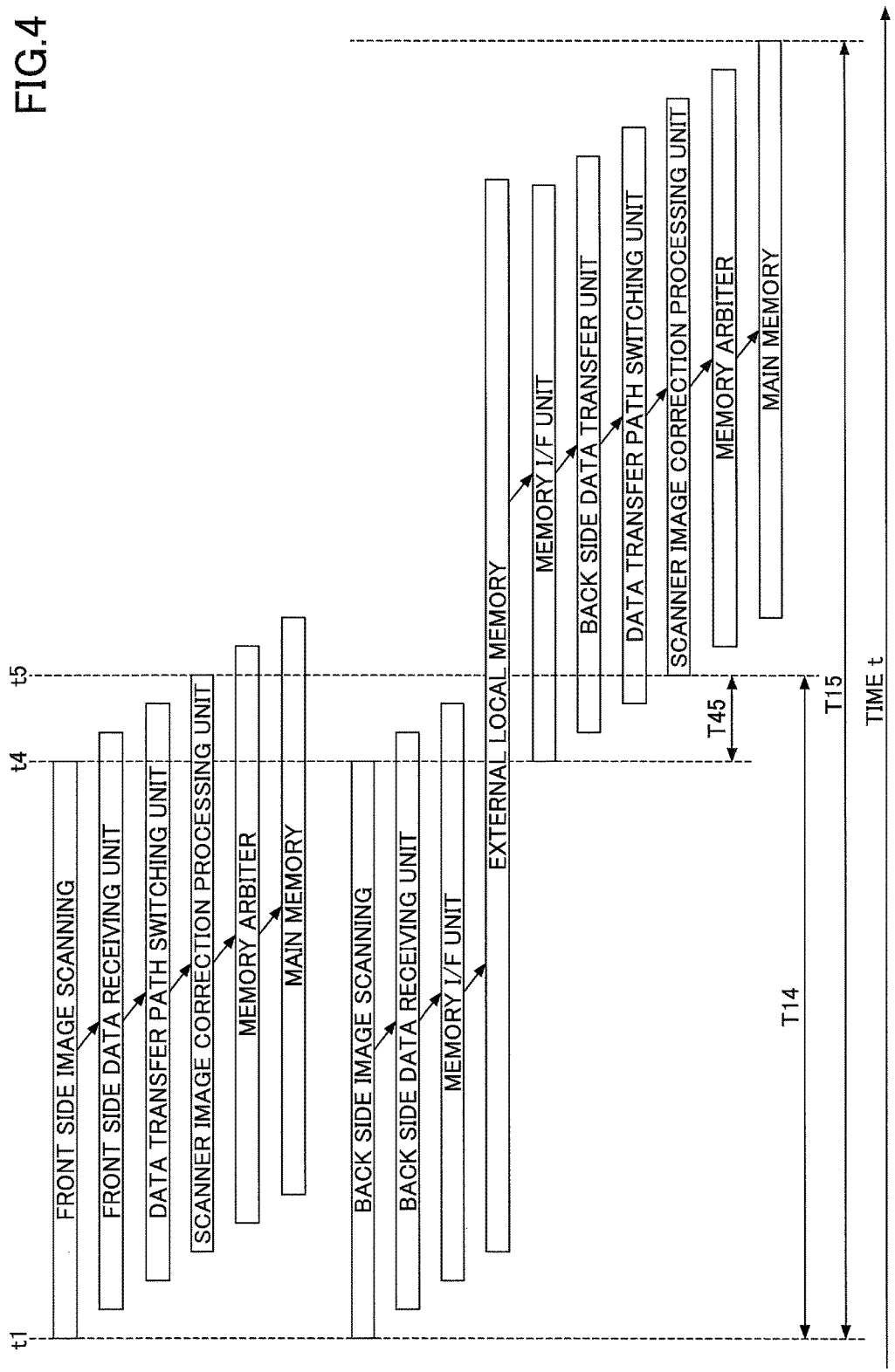
FIG. 4 is another diagram illustrating operations of the ASIC according to the first embodiment.

FIG. 4 illustrates an example case where image processing on the back side image data by the scanner image correction processing unit 306 is started at the time image processing on the front side image data by the scanner image correction processing unit 306 is completed.

In the example of FIG. 4, scanning of the front side image data and scanning of the back side image data are started at time t1.

The front side image data is transferred from the front side data receiving unit 301 to the scanner image correction processing unit 306 via the data transfer path switching unit 305 as illustrated in FIG. 3, and at time t5, image processing on the front side image data by the scanner image correction processing unit 306 is completed.

When scanning of the back side image data is started at the timing t1, the back side image data is stored in the external local memory 101 via the memory I/F unit 303. At time t4, the back side data transfer unit 304 starts retrieving the back side image data stored in the external local memory 101 via the memory I/F unit 303.

The back side image data retrieved from the external local memory 101 is transferred to the scanner image correction processing unit 306 via the data transfer path switching unit 305 during a time period T45 from time t4 to time t5. That is, the time period T45 from time t4 to time t5 corresponds to a transfer period during which the back side image data is transferred from the external local memory 101 to the scanner image correction processing unit 306. The transfer period T45 may be determined based on the circuit configuration of the ASIC 300, for example.

At time t5, the scanner image correction processing unit 306 starts a correction process on the back side image data retrieved from the external local memory 101.

That is, the scanner image correction processing unit 306 starts the correction process on the back side image data at the same time as the completion time of the correction process on the front side image data.

According to an aspect of the present embodiment, by controlling the timing at which the back side image data is retrieved as described above, the back side image data may be retrieved before storage of the back side image data corresponding to one page in the external local memory 101 is completed, for example. In this way, the capacity of the external local memory 101 may be reduced, for example.

Also, according to an aspect of the present embodiment, by controlling the timing at which the back side image data is retrieved as described above, transfer of the front side image data and the back side image data can be controlled so that they are not transferred to the scanner image correction processing unit 306 at the same time, and one scanner image correction processing unit 306 can be used to perform correction processes on both the front side image data and the back side image data, for example. Further, in the example of FIG. 4, the correction process on the back side image data is performed immediately after the correction process on the front side image data is completed. In this way, a waiting time of the scanner image correction processing unit 306 from the time the correction process on the front side image data is completed to the time the correction process on the back side image data is started may be reduced.

Note that the timing at which retrieval of the back side image data is started is not limited to the example illustrated in FIG. 4. For example, retrieval of the back side image data may be started at the same time as the completion time of the correction process on the front side image data by the scanner image correction processing unit 306.

Figure 5:
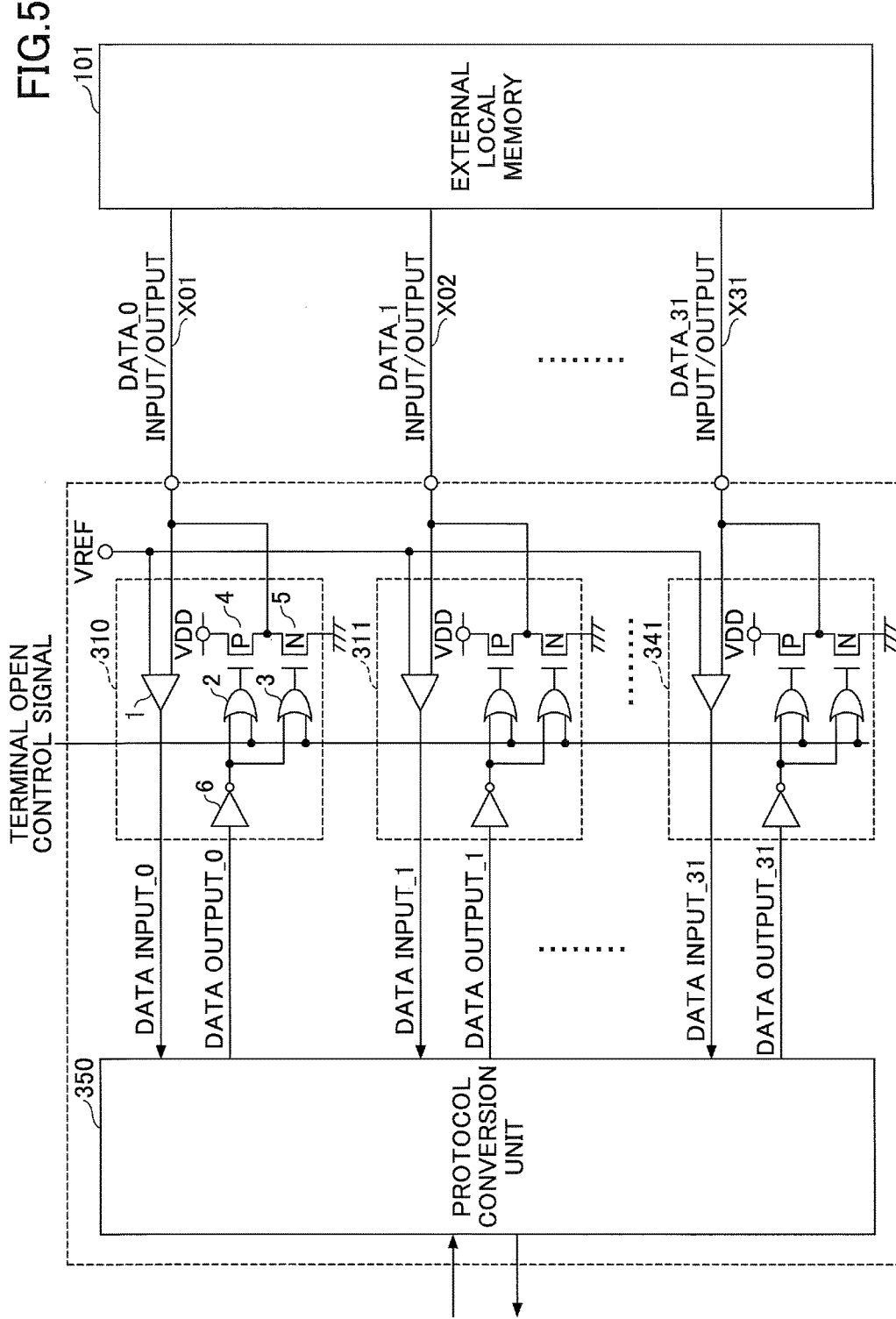
FIG. 5 is a diagram illustrating a memory interface unit included in the ASIC according to the first embodiment.

In the following, with reference to FIG. 5, the memory I/F unit 303 according to the present embodiment will be described. FIG. 5 is a diagram illustrating an example configuration of the memory I/F unit included in the ASIC 300 according to the first embodiment.

FIG. 5 illustrates an example where the memory I/F unit 303 corresponds to a 32-bit data input/output circuit. The memory I/F unit 303 of the present embodiment includes input/output terminals X01-X31 respectively corresponding to the 1St through 32nd bits, terminal processing units 310-341, and a protocol conversion unit 350.

A terminal open control signal is supplied from the mode setting register unit 308 to the terminal processing units 310-341. The terminal open control signal is controlled to be at a high level (hereinafter referred to as H level) when disconnecting the external local memory 101 from the ASIC 300, and the terminal open control signal is controlled to be at a low level (hereinafter referred to as L level) when establishing connection between the ASIC 300 and the external local memory 101.

When the terminal open signal is at the L level, the terminal processing units 310-341 control the input/output terminals X01-X31 to output the back side image data output by the protocol conversion unit 350. When the terminal open signal is at the H level, the terminal processing units 310-341 set the input/output terminals X01-X31 to a ground potential.

Note that each of the terminal processing units 310-341 may have the same configuration, and as such, the configuration of the terminal processing unit 310 will be described below.

The terminal processing unit 310 according to the present embodiment includes an input buffer 1, OR circuits 2 and 3, a P-channel transistor 4, an N-channel transistor 5, and an inverter circuit 6.

The input buffer 1 includes one input that is connected to the input/output terminal X01 and is configured to receive a signal output by the external local memory 101 according to a standard, such as HSTL (High-Speed Transceiver Logic) or SSTL (stub series terminated transceiver logic). The input buffer 1 includes another input that is connected to a reference voltage VREF. The input buffer 1 compares the signal output by the external local memory 101 with the reference voltage VREF and outputs a signal at the H level or L level. Note that the reference voltage VREF may be set to about ½ of the power supply voltage of the external local memory 101, for example.

The OR circuit 2 controls the gate of the P-channel transistor 4. When the terminal open control signal supplied to the OR circuit 2 is at the H level, the output signal of the OR circuit 2 may be set to the H level to open the P channel transistor 4. The OR circuit 3 controls the gate of the N-channel transistor 5. When the terminal open control signal supplied to the OR circuit 3 is at the H level, the output signal of the OR circuit 3 may be set to the H level to close the N-channel transistor 4. The inverter circuit 6 inverts data output by the protocol conversion unit 350. In this way, a data output signal is inverted.

The P-channel transistor 4 and the N-channel transistor 5 are connected between the power supply voltage VDD and the ground. The potential at a connection point A between the P-channel transistor 4 and the N-channel transistor 5 becomes the potential of the input/output terminal X01.

That is, when the terminal open signal is at the H level, the terminal processing unit 310 sets the potential of the input/output terminal X01 to the ground potential. In other words, the terminal processing unit 310 sets the potential of the input/output terminal X01 to the ground potential when the external local memory 101 is disconnected. Note that the terminal processing units 311-341 also perform the same operations as the terminal processing unit 310.

Thus, according to an aspect of the present embodiment, the potential of the input/output terminal of the ASIC 300 (the memory I/F unit 303) can be stabilized when the external local memory 101 is disconnected. In other words, according to an aspect of the present embodiment, the potential of the input/output terminal can be stabilized even when a connection destination for the input/output terminal of the ASIC 300 does not exist.

Note that in the above-described example, the terminal processing unit 310 is configured to fix the potential of the input/output terminal of the ASIC 300 to the ground potential. However, the configuration for fixing the potential of the input/output terminal of the ASIC 300 is not limited to the above-described configuration of the terminal processing unit 310.

That is, the terminal processing unit 310 may have any configuration as long as it is capable of fixing the potential of the input/output terminal of the ASIC 300 by outputting a terminal open signal at the H level.

By arranging the memory I/F 303 of the ASIC 300 according to the present embodiment to have the above-described configuration, for example, when the external local memory 101 is disconnected, the ASIC 300 may be prevented from being damaged due to a large current flowing through the ASIC 300 as a result of a plurality of transistors to be controlled being turned on.

Also, note that burst mode image data read/write operations may be performed between the memory I/F unit 303 and the external local memory 101 according to an aspect of the present embodiment.

By performing burst mode image data read/write operations, access efficiency to the external local memory 101 can be improved, for example.

As described above, according to an aspect of the present embodiment, the same ASIC 300 may be used regardless of whether the image scanning apparatus 100 is a duplex scanning apparatus or a simplex scanning apparatus. Thus, an ASIC for duplex scanning and an ASIC for simplex scanning do not have to be separately developed, and costs for developing an ASIC may be reduced, for example.

Also, according to an aspect of the present embodiment, the ASIC 300 can be used for both a duplex scanning apparatus and a simplex scanning apparatus, and as such, versatility of the ASIC 300 can be improved.

Note that in the image scanning apparatus 100 according to the present embodiment, image data is acquired by scanning an image with a scanner device and transferring the scanned image data to the ASIC 300. However, the method of acquiring image data is not limited thereto. For example, image data transferred to the ASIC 300 may be image data captured by an imaging device, such as a camera. That is, the method used to acquire the image data transferred to the ASIC 300 is not limited to a particular method as long as image data of each frame can be acquired and transferred to the ASIC 300, for example.

Second Embodiment

In the following, a second embodiment of the present invention will be described. The second embodiment differs from the first embodiment in that a value indicating whether the scanning device 200 includes the back side scanner device 202 is set up in advance in the mode setting register unit. In the following description of the second embodiment, features that differ from those of the first embodiment will be described. Note that features of the second embodiment having substantially the same functional configuration as those of the first embodiment are given the same reference numerals and descriptions thereof will be omitted.

Figure 6:
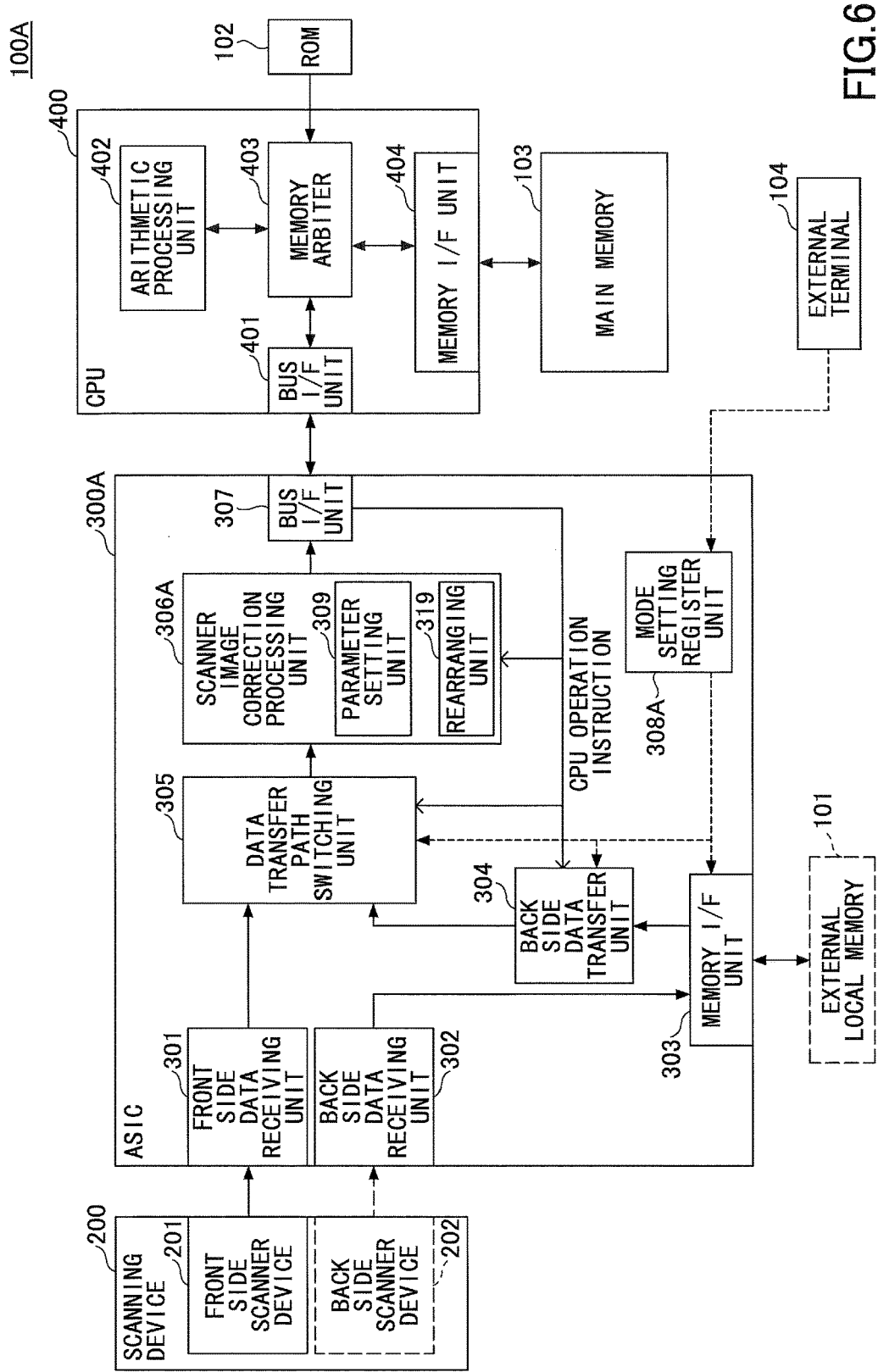
FIG. 6 is a diagram illustrating an image scanning apparatus according to a second embodiment of the present invention.

FIG. 6 is a diagram illustrating an image scanning apparatus 100A according to the second embodiment. The image scanning apparatus 100A includes an ASIC 300A including a scanner image correction processing unit 306A and a mode setting register unit 308A.

The scanner image correction processing unit 306A of the present embodiment includes a parameter setting unit 309 and a rearranging unit 319.

The parameter setting unit 309 according to the present embodiment sets parameters for the front side scanner device 201 and parameters for the back side scanner device 202 in the scanner image correction processing unit 306A.

The rearranging unit 319 according to the present embodiment corrects pixel-by-pixel deviations and line-by-line deviations of each color in the image data scanned by the scanning device 200.

The parameter setting unit 309 is further described below.

In the case where the scanning device 200 corresponds to a duplex scanning device, the configurations of the front side scanner device 201 and the back side scanner device 202 may be different.

Specifically, for example, the front side scanner device 201 may be implemented by a CCD (Charge-Coupled Device), and the back side scanner device 202 may be implemented by a CIS (Contact Image Sensor).

In such a case, parameters used for performing a correction process on the front side image data scanned by the front side scanner device 201 will be different from parameters used for performing a correction process on back side image data scanned by the back side scanner device 202.

Thus, when performing a correction process on the front side image data scanned by the front side scanner device 201, the parameter setting unit 309 of the present embodiment acquires parameters for the front side scanner device 201 and sets the acquired parameters in the scanner image correction processing unit 306A. When performing a correction process on the back side image data scanned by the back side scanner device 202, the parameter setting unit 309 acquires the parameters for the back side scanner device 202 and sets the acquired parameters in the scanner image correction processing unit 306A.

The parameters for the front side scanner device 201 and the parameters for the back side scanner device 202 may be stored in the external local memory 101 in advance, for example.

The parameter setting unit 309 according to the present embodiment may acquire parameters for the front side scanner device 201 from the external local memory 101 when scanning of the front side image data by the front side scanner device 201 is started, for example. Then, the parameter setting unit 309 sets the acquired parameters for the front side scanner device 201 in the scanner image correction processing unit 306A before the front side image data is transferred to the scanner image correction processing unit 306A.

Similarly, the parameter setting unit 309 according to the present embodiment may acquire parameters for the back side scanner device 202 from the external local memory 101 when scanning of back side image data by the back side scanner device 202 is started, for example. Then, the parameter setting unit 309 sets the acquired parameters for the back side scanner device 202 in the scanner image correction processing unit 306A before the back side image data is transferred to the scanner image correction processing unit 306A.

The parameter setting unit 309 according to the present embodiment executes the above-described processes each time the front side scanner device 201 and/or the back side scanner device 202 performs image scanning.

As described above, according to an aspect of the present embodiment, when performing a correction process on image data, parameters for the scanner device that has scanned the image data are acquired from the external local memory 101 and set in the scanner image correction processing unit 306A. Thus, according to an aspect of the present embodiment, a correction process may be performed on image data according to individual characteristics of the scanner device that has scanned the image data, and in this way, image quality degradation may be prevented, for example.

Also, according to an aspect of the present embodiment, the parameter setting unit 309 directly acquires parameters for each scanner device from the external local memory 101, and as such, mediation of the CPU 400 may not be necessary in setting the parameters. Thus, according to an aspect of the present embodiment, the time required for setting parameters for each scanner device may be reduced, and the processing load of the CPU 400 relating to parameter setting may be reduced, for example.

Note that in the present embodiment, the parameters for each scanner device are stored in the external local memory 101 in advance. However, the present invention is not limited to such an arrangement, and the parameters for each scanner device may be stored in any memory that can be accessed by the parameter setting section 309 without intervention by the CPU 400.

In the following, the rearranging unit 319 is further described.

In the case where the scanning device 200 corresponds to a duplex scanning device, as described above, the configurations of the front side scanner device 201 and the back side scanner device 202 may be different. In this case, pixel-by-pixel deviations and line-by-line deviations may occur in the image data scanned by the front side scanner device 201 and the image data scanned by the back side scanner device 202.

The rearranging unit 319 of the present embodiment corrects such deviations by rearranging image data of each color.

As described above, in the present embodiment, image deviations occurring as a result of differences in the configurations of the front side scanner device 201 and the back side scanner device 202 can be corrected. Thus, the ASIC 300A according to the present embodiment can be applied to an image scanning apparatus including a plurality of scanner devices having different configurations, and versatility of the ASIC 300A can be improved.

The mode setting register unit 308A according to the present embodiment is connected to an external terminal 104 provided outside the ASIC 300A.

Specifically, for example, in the case where the image scanning apparatus 100A is a duplex scanning apparatus, the mode setting register unit 308A may be connected to the external terminal 104 that has a potential fixed at the ground potential (L level), and in the case where the image scanning apparatus 100A is a simplex scanning apparatus, the mode setting register unit 308A may be connected to the external terminal 104 that has a potential fixed at a power supply potential (H level).

In this example, when an L level signal is input, the mode setting register unit 308A according to the present embodiment supplies the L level signal to the memory I/F unit 303 in order to disable terminal processing for disconnecting the external local memory 101. In other words, the mode setting register unit 308A controls the ASIC 300A to be connected to the external local memory 101.

When an H level signal is input, the mode setting register unit 308A according to the present embodiment supplies the H level signal to the memory I/F unit 303 in order to implement terminal processing for disconnecting the external local memory 101. In other words, the mode setting register unit 308A controls the ASIC 300A to be disconnected from the external local memory 101.

According to an aspect of the present embodiment, by supplying a fixed value indicating whether the image scanning apparatus 100A is a duplex scanning apparatus or a simplex scanning apparatus to the mode setting register unit 308A, connection mode setting using the CPU 400 may be unnecessary.

Third Embodiment

In the following, a third embodiment of the present invention will be described. The third embodiment differs from the first embodiment in that it implements measures to restrict power supply to components that do not need to be operated when the scanning device 200 is a simplex scanning device. In the following description of the third embodiment, features that differ from those of the first embodiment will be explained. Note that features of the third embodiment that may be substantially identical to those of the first embodiment are given the same reference numerals and descriptions thereof will be omitted.

Figure 7:
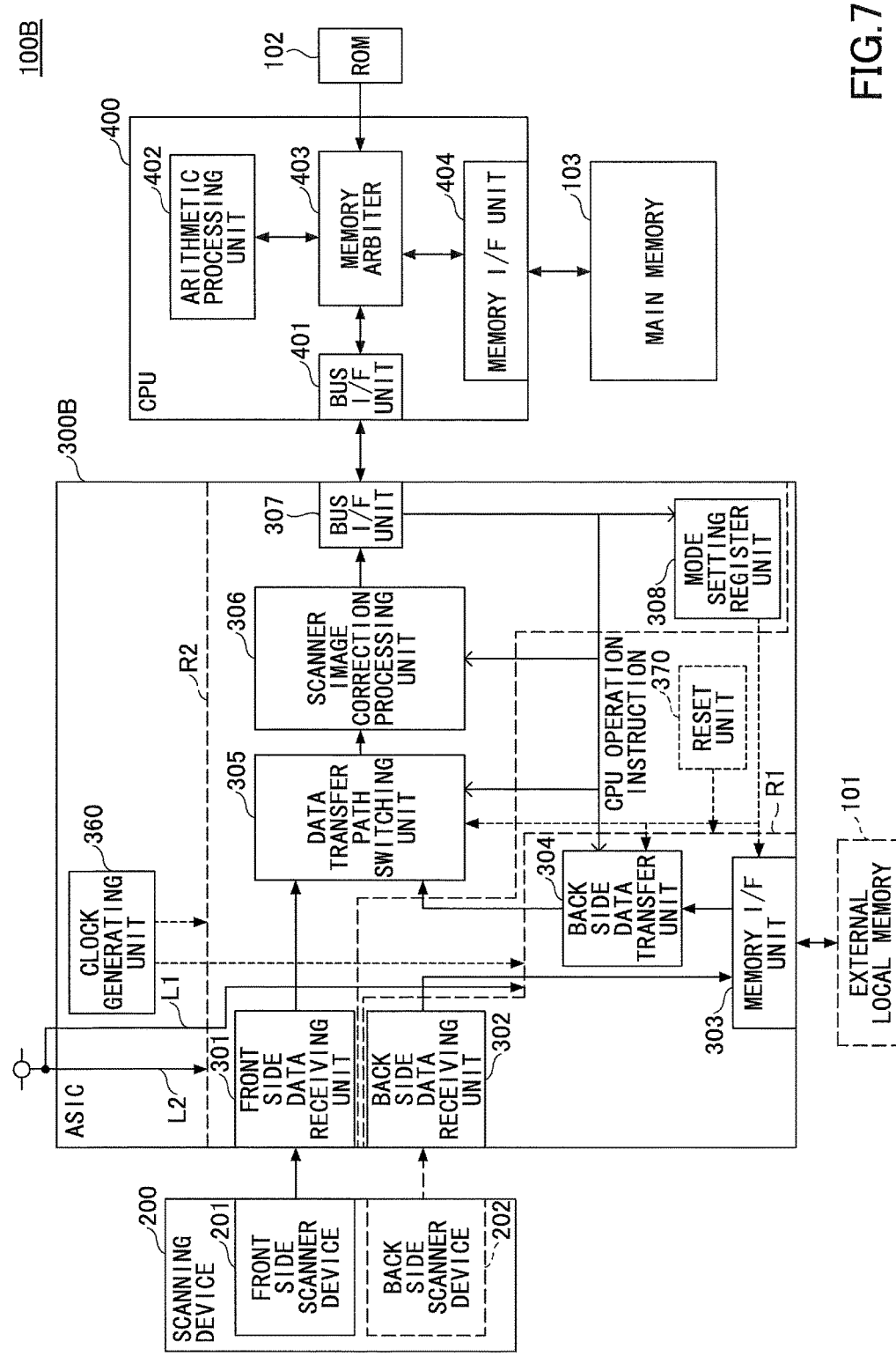
FIG. 7 is a diagram illustrating an image scanning apparatus according to a third embodiment of the present invention.

FIG. 7 is a diagram illustrating an example configuration of an image scanning apparatus 100B according to the third embodiment. The image scanning apparatus 100B according to the present embodiment includes an ASIC 300B.

The ASIC 300B according to the present embodiment includes a region R1 and a region R2. The region R1 is where components that are only operated when the scanning device 200 is a duplex scanning device are implemented, including the back side data receiving unit 302, the memory I/F unit 303, and the back side data transfer unit 304. The region R2 is where the front side data receiving unit 301, the data transfer path switching unit 305, the scanner image correction processing unit 306, the bus I/F unit 307, and the mode setting register unit 308 are implemented.

In the present embodiment, when the scanning device 200 is a simplex scanning device, power supply to the region R1 is restricted.

For example, the ASIC 300B according to the present embodiment includes a clock generating unit 360. The clock generating unit 360 supplies a clock signal to the units of the ASIC 300B.

In the case where the scanning device 200 is a duplex scanning device, the clock generating unit 360 according to the present embodiment supplies a clock signal to each of the units implemented in the regions R1 and R2. In the case where the scanning device 200 is a simplex scanning device, the clock generating unit 360 stops supplying the clock signal to the units implemented in the region R1 and supplies the clock signal only to the units implemented in the region R2. Note that the clock generating unit 360 may receive an instruction from the CPU 400 relating to the region to which the clock signal is to be supplied, for example.

According to an aspect of the present embodiment, when the scanning device 200 is a simplex scanning device, power consumption can be reduced by stopping the supply of the clock signal to a component that does not have to be operated.

Also, the ASIC 300B according to the present embodiment includes a reset unit 370. When the scanning device 200 is a simplex scanning device, the reset unit 370 supplies a reset signal to the units implemented in the region R1 to reset these units. The reset unit 370 may supply a reset signal to the units implemented in the region R1 in response to receiving an instruction to supply the reset signal from the CPU 400, for example.

According to an aspect of the present embodiment, in the case where the scanning device 200 is a simplex scanning device, power consumption may be reduced by resetting a component that does not have to be operated.

Also, according to an aspect of the present embodiment, in the case where the scanning device 200 is a simplex scanning device, power supply to the region R1 may be cut off.

In the ASIC 300B according to the present embodiment, power is supplied to the region R1 via a power supply line L1, and power is supplied to the region R2 via a power supply line L2.

Thus, in the case where the scanning device 200 is a simplex scanning device, power supply to the region R1 where components that do not need to be operated are implemented may be cut off by cutting off the power supply line L1.

Specifically, according to an aspect of the present embodiment, in the case where the scanning device 200 is a simplex scanning device, the CPU 400 may perform control operations to cut off the power supply line L1.

For example, in the present embodiment, a switch for controlling disconnection/connection between the power supply line L1 and each unit of the region R1 may be provided, and in the case where the scanning device 200 is a simplex scanning device, the CPU 400 may cut off connection between the power supply line L1 and each unit of the region R1 using the switch. Note that the switch may be provided outside the ASIC 300B, for example.

As can be appreciated from the above, according to an aspect of the present embodiment, in the case where the scanning device 200 is a simplex scanning device, power consumption may be reduced by cutting off power supply to a component that does not have to be operated.

Note that each of the image scanning apparatuses 100, 100A, and 100B described above may be connected to an image output apparatus to constitute an image forming apparatus, for example.

Figure 8:
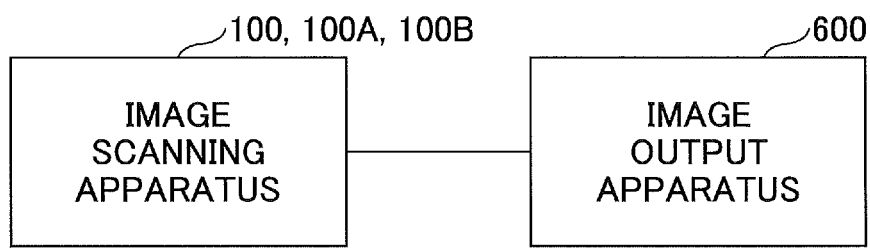
FIG. 8 is a diagram illustrating an image forming apparatus.

FIG. 8 is a diagram illustrating an image forming apparatus 500 including the image scanning apparatus 100, 100A, or 100B. The image forming apparatus 500 of FIG. 8 includes the image scanning apparatus 100, 100A, or 100B and an image output apparatus 600.

The image output apparatus 600 may be an engine unit including a plotter, for example. In the image forming apparatus 500, image data scanned by the image scanning apparatus 100, 100A, or 100B is output to the image output apparatus 600.

The image output apparatus 600 forms an image based on the input image data and outputs the image by fixing the image on a recording medium such as printing paper, for example.

Although the present invention has been described above with reference to certain illustrative embodiments, the present invention is not limited to these embodiments, and numerous variations and modifications may be made without departing from the scope of the present invention.

Also, note that the present invention may be implemented using an ASIC (application specific integrated circuit) or an apparatus in which circuit modules are connected.

Further, each of the functions (units) described in connection with the above embodiments may be implemented by one or more circuits.

The one or more circuits described above may include a processor programmed by software to execute a corresponding function, and/or hardware, such as an ASIC or a circuit module, designed to execute a corresponding function, for example.

What is claimed is:

1. An information processing apparatus comprising:
a mode setting unit in which a value indicating whether a scanning device is for simplex scanning or duplex scanning is set up;
an interface unit configured to control whether to enable signal exchange with an external memory based on the value set up in the mode setting unit; and
a transfer unit configured to retrieve image data from the external memory and transfer the image data to an image processing unit based on the value set up in the mode setting unit;
wherein when the value set up in the mode setting unit indicates that the scanning device is for duplex scanning, the interface unit enables signal exchange with the external memory, and the transfer unit transfers the image data retrieved from the external memory to the image processing unit; and
wherein when the value set up in the mode setting unit indicates that the scanning device is for simplex scanning, the interface unit prohibits signal exchange with the external memory.

2. The information processing apparatus according to claim 1, wherein
when the value set up in the mode setting unit indicates that the scanning device is for simplex scanning, the interface unit cuts off an input from the external memory and an output from the interface unit.

3. The information processing apparatus according to claim 1, wherein
when the mode setting unit is connected to an external terminal at a power supply potential, the value set up in the mode setting unit indicates that the scanning device is for duplex scanning; and
when the mode setting unit is connected to an external terminal at a ground potential, the value set up in the mode setting unit indicates that the scanning device is for simplex scanning.

4. The information processing apparatus according to claim 1, wherein
when the value set up in the mode setting unit indicates that the scanning device is for simplex scanning, electric power supplied to the interface unit and the transfer unit is restricted.

5. The information processing apparatus according to claim 1, further comprising:
the image processing unit;
wherein when the value set up in the mode setting unit indicates that the scanning device is for duplex scanning, the image processing unit performs image processing on front side image data that has been scanned by a front side scanning device of the scanning device, and after the image processing on the front side image data by the image processing unit has been completed, the transfer unit transfers to the image processing unit, back side image data that has been scanned by a back side scanning device of the scanning device and stored in the external memory.

6. The information processing apparatus according to claim 5, wherein
the image processing unit includes a parameter setting unit that sets up a parameter for the front side scanning device before performing the image processing on the front side image data, and sets up a parameter for the back side scanning device after the image processing on the front side image data has been completed.

7. The information processing apparatus according to claim 5, wherein
the image processing unit includes a rearranging unit that corrects an image data deviation of each color in the front side image data and the back side image data.

8. An information processing method that is implemented by an information processing apparatus, the information processing method comprising:
setting up a value indicating whether a scanning device is for simplex scanning or duplex scanning;
controlling whether to enable signal exchange with an external memory based on the value that has been set up; and
retrieving image data from the external memory and transferring the image data to an image processing unit based on the value that has been set Up;
wherein when the value that has been set up indicates that the scanning device is for duplex scanning, control is implemented to enable signal exchange with the external memory and the image data retrieved from the external memory is transferred to the image processing unit; and
wherein when the value that has been set up indicates that the scanning device is for simplex scanning, control is implemented to prohibit signal exchange with the external memory.

9. The information processing method according to claim 8, further comprising:
cutting off an input from the external memory and an output from the information processing apparatus when the value set up in the mode setting unit indicates that the scanning device is for simplex scanning.

10. The information processing method according to claim 8, further comprising:
setting up the value indicating that the scanning device is for duplex scanning in a mode setting unit when the mode setting unit is connected to an external terminal at a power supply potential; and
setting the value indicating that the scanning device is for simplex scanning in the mode setting unit when the mode setting unit is connected to an external terminal at a ground potential.

11. The information processing method according to claim 8, further comprising:
restricting electric power supplied to a component that is not operated when the value that has been set up indicates that the scanning device is for simplex scanning.

12. The information processing method according to claim 8, wherein
when the value that has been set up indicates that the scanning device is for duplex scanning, the image processing unit performs image processing on front side image data that has been scanned by a front side scanning device of the scanning device, and after the image processing on the front side image data by the image processing unit has been completed, back side image data that has been scanned by a back side scanning device of the scanning device and stored in the external memory is transferred to the image processing unit.

13. The information processing method according to claim 12, further comprising:
setting up a parameter for the front side scanning device before performing the image processing on the front side image data; and
setting up a parameter for the back side scanning device after the image processing on the front side image data has been completed.

14. The information processing method according to claim 12, further comprising:
correcting an image data deviation of each color in the front side image data and the back side image data.

15. A non-transitory computer-readable medium storing a program that when executed causes an information processing apparatus to perform an information processing method comprising:
setting up a value indicating whether a scanning device is for simplex scanning or duplex scanning;
controlling whether to enable signal exchange with an external memory based on the value that has been set up; and
retrieving image data from the external memory and transferring the image data to an image processing unit based on the value that has been set Up;
wherein when the value that has been set up indicates that the scanning device is for duplex scanning, control is implemented to enable signal exchange with the external memory and the image data retrieved from the external memory is transferred to the image processing unit; and
wherein when the value that has been set up indicates that the scanning device is for simplex scanning, control is implemented to prohibit signal exchange with the external memory.

* * * * *